March 29, 1966 J. H. RAMSAY 3,243,810
INTERPOLATED BASE HEIGHT RADAR COMPUTER
Filed Nov. 27, 1963 11 Sheets-Sheet 1

INVENTOR.
JAMES H. RAMSAY
BY
Wade Koontz
Robert K. Duncan Jr
ATTORNEYS

March 29, 1966 J. H. RAMSAY 3,243,810
INTERPOLATED BASE HEIGHT RADAR COMPUTER
Filed Nov. 27, 1963 11 Sheets-Sheet 2

INVENTOR.
JAMES H. RAMSAY
BY Wade Koonty
Robert K. Duncan
ATTORNEYS

March 29, 1966    J. H. RAMSAY    3,243,810
INTERPOLATED BASE HEIGHT RADAR COMPUTER
Filed Nov. 27, 1963    11 Sheets-Sheet 5

INVENTOR.
JAMES H. RAMSAY
BY
Wade Koontz
Robert K. Duncan
ATTORNEYS

Fig-5

March 29, 1966 J. H. RAMSAY 3,243,810
INTERPOLATED BASE HEIGHT RADAR COMPUTER
Filed Nov. 27, 1963 11 Sheets-Sheet 9

Fig-10

INVENTOR.
JAMES H. RAMSAY
BY
ATTORNEYS

March 29, 1966 — J. H. RAMSAY — 3,243,810
INTERPOLATED BASE HEIGHT RADAR COMPUTER
Filed Nov. 27, 1963 — 11 Sheets-Sheet 10

FIG-11

INVENTOR.
JAMES H. RAMSAY
BY Wade Koontz
Robert K. Duncan
ATTORNEYS

United States Patent Office 3,243,810
Patented Mar. 29, 1966

3,243,810
INTERPOLATED BASE HEIGHT RADAR COMPUTER

James H. Ramsay, Severna Park, Md., assignor, by mesne assignments, to the United States of America as represented by the Secretary of the Air Force
Filed Nov. 27, 1963, Ser. No. 326,645
6 Claims. (Cl. 343—11)

This invention relates to a computer system for determining the height of a radar target. More specifically, it relates to an analog computer system to be used with a vertically stacked beam type of radar that will determine by component summation target height with greater accuracy than heretofore obtainable.

Prior stacked beam radar height finders compute target height ($H_t$) by a two-part computation involving (1) determination of the sine of the angle of elevation of the target (sin $\theta_t$) and (2) the multiplication of sin $\theta_t$ by the slant range of the target (R). The value of the sine of the angle of elevation has been determined by the computer system simultaneously examining the target returns in all the stacked beams, then in one operation, either by a peak finding or null finding system, the sine of the angle of the target has been obtained. This value is then multiplied by the slant range of the target. This type of computer for determining target height is commonly called a center-of-gravity type computer. One of the inherent sources of inaccuracy arises from the wide dynamic range required of the multiplier system.

The system disclosed by the present invention determines the target height ($H_t$) by the summation of a series of components, with the major sources of inaccuracies confined to the numerically smaller components. It may be referred to as an adjacent beam type of computer. In addition to obtaining the value of the horizontal target height (sin $\theta_t$ times R) more accurately than the center-of-gravity type computer obtains the value, the computer system herein disclosed provides a system in which other components of the absolute target height may readily be included and the true target height above the terrain obtained.

In the adjacent beam type computer disclosed herein, as in the prior center of gravity type computers, all the stacked beams of the radar are radiated, simultaneously and in phase, with the power from a single transmitter. Thus a single burst of energy emanates from the radar set to illuminate all targets in the coverage volume. During the receive period echoes return to the radar, but each of the stacked beams is switched by duplexer tubes to a separate receiver. Each beam then has a separate identity during the receive period. The beams overlap in space to prevent voids in coverage.

It is an object of the present invention to provide a height finding system for stacked beam radars that will determine target heights with great accuracy.

It is another object of the present invention to provide a target height computing system for stacked beam radars that operates in "real radar time," such that the target height is obtained essentially instantaneously and can be displayed concurrently with the received target echo.

It is another object of the present invention to provide a target height computing system for stacked beam radars that will accept multiple targets and provide target height information essentially simultaneously on all of them, except for the unlikely occurrence of multiple targets of identical ranges, identical azimuths, and of altitude separations less than a beam width of either the adjacent beams in which the targets are located; in which instance one composite target height is shown.

It is another object of the present invention to provide a height computing system for stacked beam radars in which the electrical computing system will readily accept additional information to compensate for variations in the physical parameters of the radar system, such as unequal beam widths in the stacked beams, beam angle corrections, antenna tilt information, beam strength compensations, radar antenna site elevation correction, atmospheric correction, and earth curvature corrections.

Various other objects and advantages will appear from the following description of the embodiments of the invention shown, and the novel features will be particularly pointed out in the appended claims.

In the drawings:

FIG. 6 geometrically shows a representative target at a critical location with respect to the operation of the system;

FIG. 9 is a block diagram of the interpolation height generator;

Figure 1:
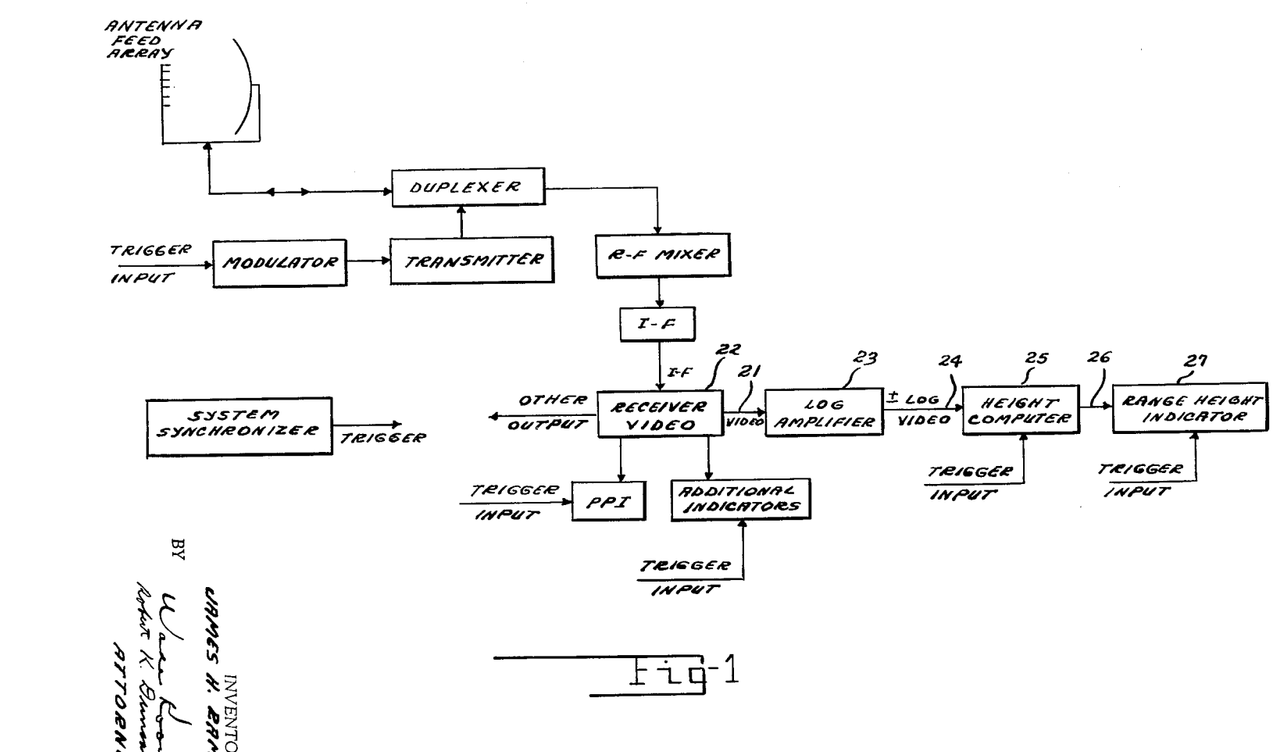
FIG. 1 is a block diagram of a representative stacked beam radar system utilizing the disclosed height computer.

Referring more in detail to the drawings, FIG. 1 is a block diagram of a typical stacked beam radar system with the height computer herein disclosed incorporated in the system. As previously indicated, each antenna beam has a separate receiving system thus the video line 21 from receiver 22 is a multichannel line; each antenna beam being represented by a channel. Logarithmic amplifier 23 furnishes the height computer with a multi-channel input 24 consisting of both the positive and negative logarithmic values of the signals in each beam. The height computer 25 is the herein disclosed adjacent beam type on which only the returns from the two adjacent beams that contain the target are used to compute height.

The computer is completely automatic and operates on any number of targets, generating a height output instantaneous with the target return. The output 26 of the height computer is a pulse of video with its amplitude proportional to target height. The height computation for a particular target is accomplished during the returned pulse width of the target echo. This makes height computations possible on all targets seen during each pulse repetition period. This information can be displayed on the range height indicator 27 without further processing for manual determination of height. The range height indicator 27 measures the amplitude of the target height pulse and displays it by conventional means, in feet above the earth's sea level surface. The target range, either slant range, or horizontal range, may be obtained and displayed simultaneously by conventional means.

Figure 2:
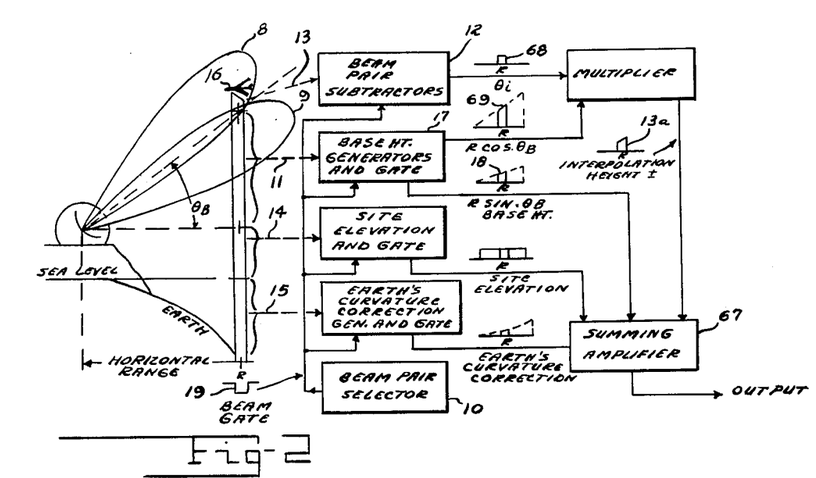
FIG. 2 is a pictorial block diagram illustrative of the functioning of the computer. The pictorial representation is intentionally distorted for explanatory purposes.

FIG. 2 is a distorted pictorial view of a radar site and a partial block diagram showing an embodiment of the present invention. In this embodiment, in addition to the horizontal target height being computed, the radar site elevation, and the earth's curvature correction factors are included in the computation. Adjacent beam pairs 8 and 9 define base angle $\theta_B$. Beam pair selector 10 has located target 16 in this beam pair. This establishes a base height 11. Beam pair subtractors 12 determine an interpolation angle, $\theta_i$ (plus or minus), proportional to displacement and direction of target 16 from base angle $\theta_B$. By multiplying $\theta_i$ times the slant range R and the cosine of the base angle, the interpolation height 13 is obtained. The total target height is obtained by summing the site elevation 14, the earth's curvature correction 15, the base height 11, and the interpolation height 13 in summing amplifier 67. These four components of height are summed together to derive the target altitude above sea level as follows:

Height=site elevation+earth's curvature+base height+interpolation height or $$H = S.E. + KR^2 + R \sin \theta_B + \theta_i R \cos \theta_B$$

where $H$=height (above sea level)
$S.E.$=site elevation (above sea level)
$K$=constant
$R$=slant range of targets for the beam pair
$\theta_B$=base angle of the beam pair
$\theta_i$=interpolation angle The site elevation, earth's curvature and base height components are determined by the mechanical and geometrical configuration of the radar antenna site and the range of the target. Therefore, these portions of height are simple functions of range. Site elevation is a constant, $KR^2$ is a parabola, $R \sin \theta_B$ is a sawtooth, the amplitude (slope of the function line) depending on the beam pair involved. Thus the magnitudes at the proper time, of the instantaneous values of electrical function generators will give the desired respective portions of height.

The validity of the foregoing statements and the structure for deriving the values indicated will be subsequently explained, for the present it is advantageous to look at the computer functionally in its entirety. To continue, to derive that portion of the total height pulse required from each of the functions, they are simply switched on or gated through, to the summing amplifier for approximately six microseconds in response to an echo from beam gate pulse 19. Upward or downward pulse tilt is negligible during an interval as small as six microseconds.

The decision of which one of the base height function generators 17 to choose (there is one for each pair of stacked beams) is made by the beam pair selector 10. This is accomplished by circuits which sense the beam pair containing the largest echo amplitude of that particular target. The appropriate gate, representing that beam pair and occurring in time representing that target slant range, turns on and gates a six microsecond piece of the base height sawtooth 18 to the summing amplifier. By similar action, the beam gate 19 gates the appropriate values of the additional components of the target height to the summing amplifier.

The interpolation height 13, represented by pulse 13a, is the only component derived by an analog multiplication process. The interpolation height 13 is a relatively small portion of the horizontal target height, the horizontal target height being the base height 11 plus the interpolation height 13. Typical ratios of interpolation height to horizontal height occur in the range of 1/10 to 1/3 as this invention is used with conventional stacked beam radars. Therefore, a higher accuracy is achieved in this adjacent beam type computer for the same multiplier accuracy than is obtained in prior center-of-gravity type computers, and in addition the multiplier is inherently more accurate in the disclosed system since it does not have to have as large a dynamic range.

Figure 3:
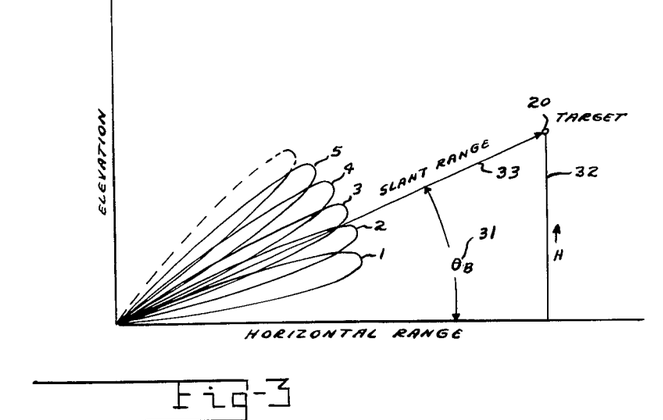
FIG. 3 is representative of a partial radiation reception pattern of a stacked beam antenna array.

FIG. 3 shows the partial radiation reception pattern of a stacked beam radar antenna array. Typical radars of this type employ approximately ten overlapping beams to cover the elevation angle from the horizon to approximately 30 degrees. As is well understood in the art, the representation of an antenna beam, whether used in transmission or reception, is made by plotting the contour of levels of intensity, thus the plot of a beam has a definite shape and the beam may be represented by the plotted contour.

Target 20 is shown on the base angle 31 ($\theta_B$) of beams 2 and 3. The base angles of a stacked beam array are defined as those angles for which the target return is equal in two adjacent beams. Geometrically it may be seen that target height 32 is equal to the slant range 33 times the sine of $\theta_B$ (angle 31). For targets located between two base angles an amount is added or subtracted from a base height. The base height is a value of height figured as though the target were located on the nearest base angle at its true slant range.

Height computation in a stacked beam radar system is possible by virtue of the Gaussian shape of the antenna beams. In taking the logarithm of these Gaussian characteristics in the logarithmic amplifier 23 (FIG. 1), the antenna beams appear to have parabolic shapes as a function of vertical angle. Upon taking the difference of two overlapping parabolas in space, this difference, as a function of angular displacement, is a linear function of vertical angle. Thus, by subtracting the logarithmic outputs of the signal strengths in the two adjacent beams forming the base angle nearest the target, the linear angular position of the target relative to the base angle is obtained. The height computer determines the horizontal target height by determining which beam pair contains the target and produces a base height. To this base height a component of height is added or subtracted based upon the position of the target in the beam pair, using the linear characteristics previously mentioned.

Figure 4:
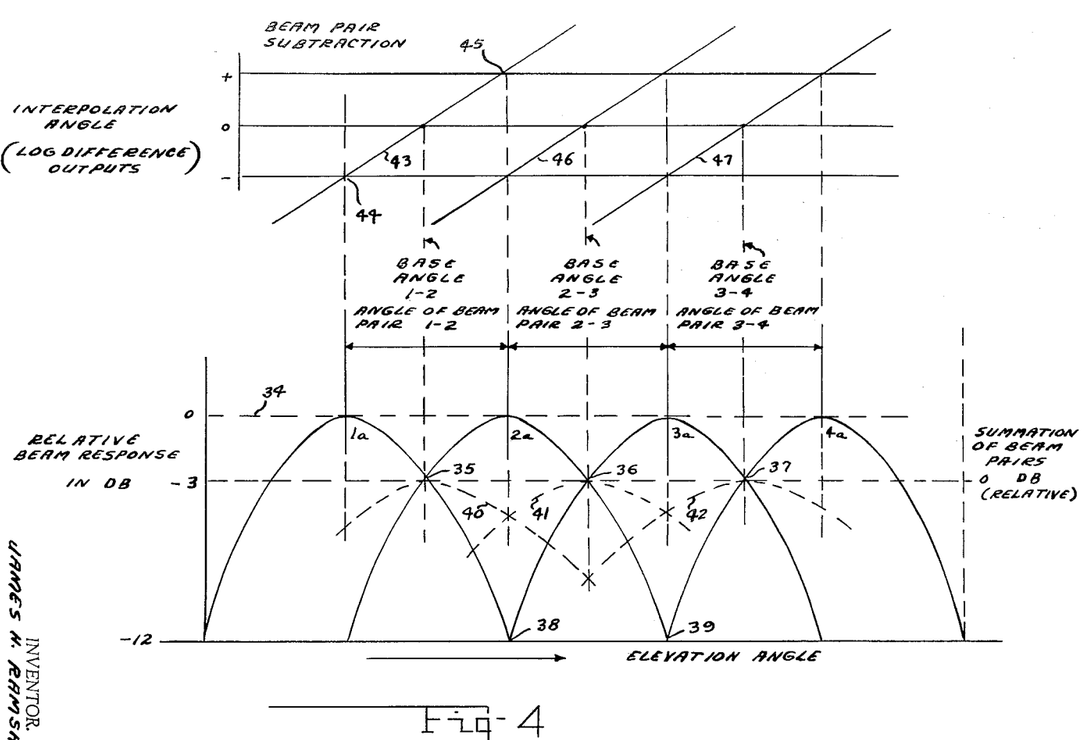
FIG. 4 is an expanded view of beam tips 1, 2, 3 and 4 showing beam subtraction technique.

FIG. 4 is an expanded view of beams 1, 2, 3 and 4 having beam tips 1a, 2a, 3a and 4a; again bearing in mind that what is shown are contours of intensity and not "pictures of beams." Curves 1a, 2a, 3a and 4a are logarithms of the Gaussian antenna beam pattern contours and they are thus parabolic. If the maximum relative intensities of the beams are taken as zero db, 34, the first cross-over of adjacent beam pairs occurs at −3 db (3 db down), 35, 36, 37, and the second cross-over of beams occurs at the −12 db level, 38 and 39. The dotted curves 40, 41, and 42 show (scaled down) the relative summation of adjacent beam pairs. The beam pair selector 10 (FIG. 2) selects the beam pair containing the target by peak selection by summing adjacent beams adjacent beams according to the responses set forth by the summation curves. Then after the target is located in a beam pair, the location within the beam pair is determined by subtracting the relative target signal strengths in those beams. Considering the tips of beams 1 and 2, represented by parabolas 1a and 2a, the subtraction is accomplished by taking the summation of the positive logarithm output of beam 2 obtained from logarithmic amplifier 23 (FIG. 1) and the negative output of beam 1 obtained from logarithmic amplifier 23. This subtraction produces the linear curve 43. A target appearing "on the nose" of beam 1 would be located at 44 on this curve, and a target appearing "on the nose" of beam 2 would be located at 45, and the proportionality of the relative strengths of a target located between beams 1 and 2 would position its location along line 43.

These facts may be seen to apply also to all the beam pairs contained by the stacked beam radar system.

The beams are fixed in space by the physical geometry of the stacked beam array, thus the base angles are fixed. When a target echo is received, the beam pair selector 10 (FIG. 2), by an adjacent beam summation process, locates the target by its peak response in one of the family of curves represented by curves 40, 41, 42. This determines a specific target base angle. Since the values of elevation of the base angles are known, the values of their angles of separation are also known. The beam pair subtractors 12 (FIG. 2) determine the interpolation angle, which is the angle, positive or negative, measuring the departure of the target from the nearest base angle. The value of the interpolation angle is mathematically contained in the family of curves represented by 43, 46 and 47.

Figure 5:
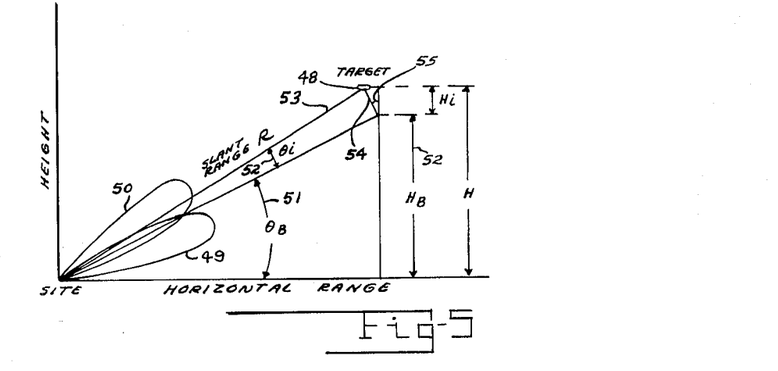
FIG. 5 geometrically shows the addition of the interpolation height to the base height.

FIG. 5 shows the mathematical derivation of the horizontal height. Again, for explanatory purposes, the figure is distorted. In a typical stacked beam radar, ten beams might be used to cover approximately 30 degrees of elevation. These ten beams would constitute nine pairs of beams forming nine base angles so the base angle separation would be less than five degrees (assuming, for the present, all beams are of equal width) making the maximum amount of the interpolation somewhat less than 2½ degrees.

Target 48 has been located in beam pair 49, 50 which form base angle 51. Since the interpolation angle 52, $\theta_i$, is small, as previously indicated, three valid assumptions may be made: one, that the base height 52 is equal to the slant range 53 times the sine of the base angle 51; two, that the sine of the interpolation angle 52 is equal to the value of the angle in radians, thus line 54 forming the hypotenuse of the small triangle is equal to $\theta_i$ times $R$; and three, that angle 55 is equal the base angle 51. The foregoing makes the following expressions valid:

$$H = H_B + H_i$$
$$H_B = R \sin \theta_B$$
$$H_i = R \theta_i \cos \theta_B \ (\theta_i \text{ expressed in radians})$$

FIG. 6 depicts the occurrence of a target 56 at the maximal response point of antenna beam 57. Thus, for beams of equal width, it is half-way between base angles 58 and 59. It is also at the cross-over position of beam pair selection responses 60 and 61. It may be seen that the horizontal target height 62, calculated by the computer, will be the same whether the beam pair selector 10 selects base angle 58 with associated base height 63 and adds interpolation height 64, or if it selects base angle 59 with associated base height 65 and subtracts interpolation height 66. In the system herein disclosed, an area of overlap of approximately 1/10 beam width exists; in this region either computation gives identical results. In order to prevent instability in the beam pair selector 10 (FIG. 2) in the regions of beam pair selection crossovers, a precedence circuit is employed to give the higher elevation beam pair precedence over the lower beam pair. Thus, when the target response is identical in two adjacent pairs of beam pairs, as is the response of target 56 as shown by its position with respect to response curves 60 and 61, the beam pair as represented by response curve 61 delineating base angle 59 would take precedence. The structure for establishing the precedence will be set forth subsequently.

Figure 7:
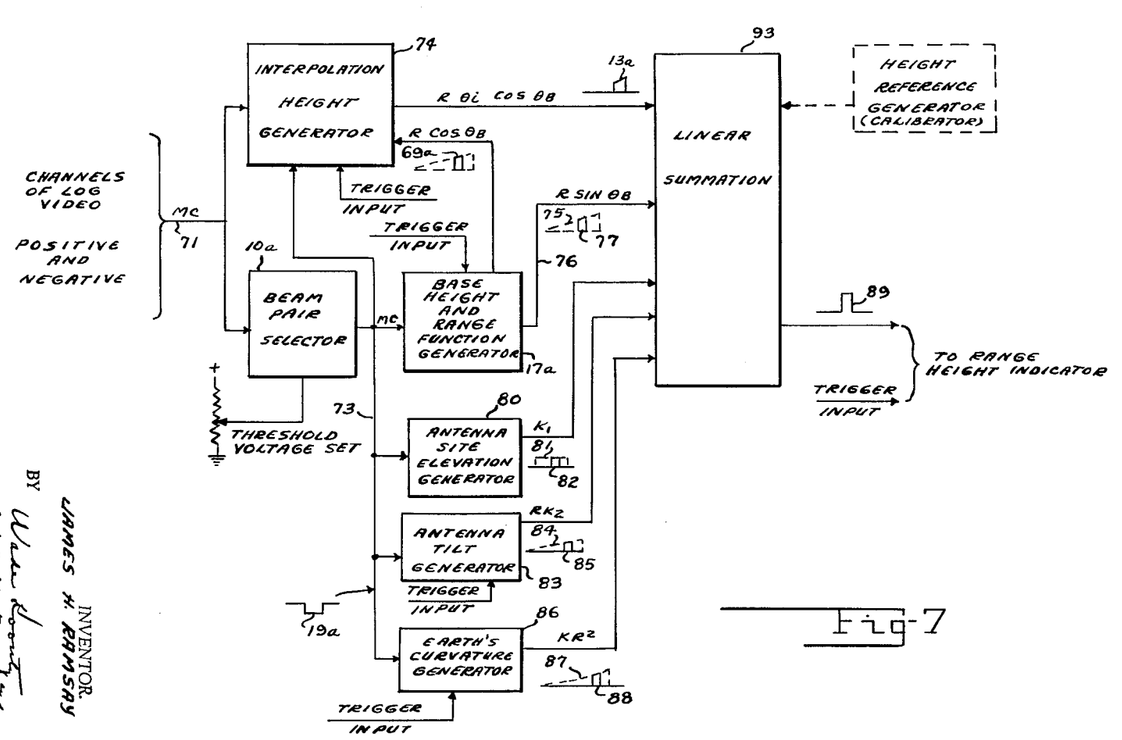
FIG. 7 is a block diagram of the height computer system.

FIG. 7 is the block diagram of the interpolated base height computer. The input 71 to the computer is the multichannel output from logarithmic amplifier 23 (FIG. 1) containing the returns, both as positive signals and as negative signals of the received signals from each beam in the antenna array. Basically, the computer performs two operations with these return signals. All other computer functions are directly related to these two basic operations.

First, the computer must determine in which receiver beam pair the target is located. Beam pair selector 10a does this by summing adjacent beams, beams 1+2, beams 2+3, etc. A beam-gating pulse 19a is generated and injected in the channel of multi-channel line 73 corresponding to the target's beam pair. This decision is made on the basis that the target is contained in that beam pair containing the largest total return energy. This beam gate may be a negative-going pulse of constant amplitude, a width of approximately six microseconds, and is delayed only about ½ microsecond from the target return. Note that the pulse in addition to gating the operation of the parts of cooperating circuits corresponding to the beam pair selected, the pulse by its relationship in time to the target echo return carries target range information.

Second, the computer must determine the relative position of the target within the selected beam pair; in other words, the deviation of the target, in direction and amount, from the base angle represented by the selected beam pair. This determination is made in the interpolation height generator 74 by subtracting the signal strength in one beam of the pair from the other. This is feasible due to the linear difference in the signal strengths of a target in adjacent beams. This difference amplitude is a direct angular proportion of the total angular difference between the two beam pair centers. (The logic of this has previously been set forth.) It is to be observed that gate 19a on the appropriate beam pair channel of line 73 determines the selection of the beam channels of line 71 in which the subtraction process takes place. This subtraction creates the value 68 of $\theta_i$, the interpolation angle (FIG. 2). This interpolation angle is multiplied by $R \cos \theta_B$, pulse 69a, and produces the interpolation height pulse 13a. Since $\cos \theta_B$ is a constant for any beam pair, this function is similar to the base height sawtooth 75, and is generated by attenuating the base height sawtooth.

The base height generator 17a generates sawtooth signals 75 whose slopes are proportional to the angles of elevation of the base angles of each of the beam pairs. These sawtooth signals are fed into transmission gates, one for each beam pair, which are operated by the appropriate beam gate from the beam pair selector 10a. Thus, if a target is located in beam pair 2–3, the transmission gate 2–3 is opened at a time corresponding to the target range, producing an output pulse 77 in line 76 whose amplitude is proportional to the base height of the target.

Antenna site elevation generator 8 generates a D.C. signal 81, the level of which is proportional to the elevation of the radar antenna above sea level. A pulse 82 of this D.C. level is gated through to the linear summation circuitry 93 by the beam gate pulse 19a. For a particular radar side installation this is a constant.

Antenna tilt generator 83 generates a signal to correct the summation of target height in accord with an overall tilting of the antenna array. If the antenna is located appreciably above the general surrounding terrain (on top of an isolated hill) it may be desirable to tilt the antenna downward, even below its horizon; conversely, if the antenna is located appreciably below the surrounding terrain, it is quite often desirable to tilt the antenna structure upwardly to the extent that the radiation beams are moved upwardly appreciably from the horizon.

Figure 13:
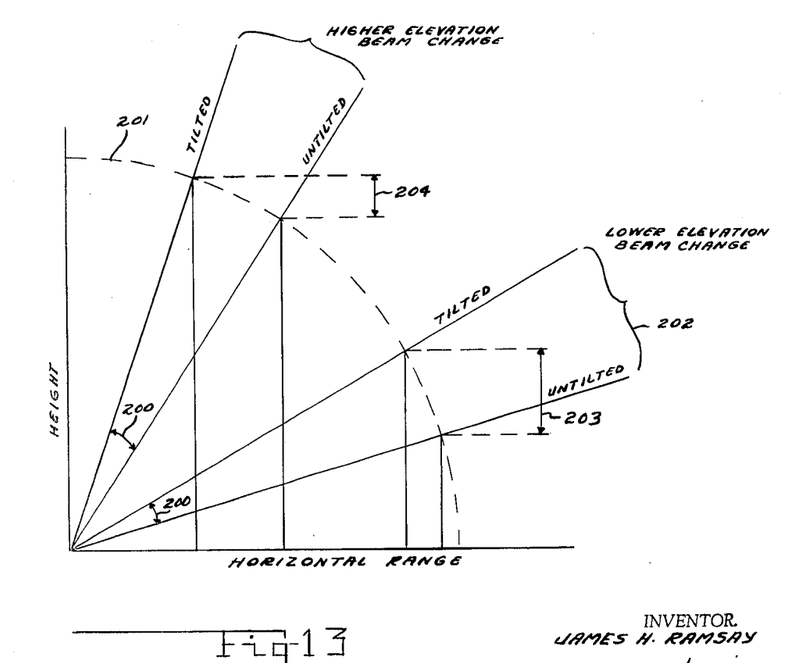
FIG. 13 shows the derivation of the correction factor necessary in the height summation as the antenna array is tilted.

FIGURE 13 shows that the correction factor for tilting the antenna varies with the relative beam angle of elevation. When the array is tilted upwardly through angle 200, targets at slant range 201, in a representative lower elevation beam that has been tilted, 202, need a correction factor as represented by line 203. A target at the same slant range observed through an upper beam that has been tilted through the same angle, 200, needs the smaller correction as represented by line 204.

Returning to FIG. 7, the tilt generator 83 generates a sawtooth signal 84 for each beam pair. The amplitude of each sawtooth is proportional to the amount the antenna array is tilted and inversely proportional to the relative magnitude of elevation of each beam pair from the horizon. The beam gate pulse 19a then gates a pulse 85, which may be represented as the slant range times a constant, from the sawtooth of the beam pair containing the target to the linear summation circuitry 93.

The earth's curvature generator 86 generates a function that takes into consideration the difference between sea level and the horizontal as projected tangent to the earth's surface at the antenna site. An exaggerated view of this elevation is shown, 15, in FIG. 2. The function generated is proportional to a constant K times the square of the slant range. This results in a function having parabolic characteristics 87. Generally, a correction for atmospherics is included in the value of the constant "K." The parabolic wave shape may be obtained by the integration of a generated sawtooth wave. Again, the beam gate pulse 19a gates a pulse 88 from the parabolic function representing the beam pair containing the target (note that there must be a function generator for each beam pair) through to the linear summation circuitry 93. From the view in FIG. 2, and by mathematical considerations, it is readily seen that technically this method will not result in the correct value of target height since the value as derived for the earth's curvature does not lie on an extended radius of the earth. However, the error is small and the value of K is derived to some extent empirically, thus the result obtained is a valuable component of target height.

The beam gate pulse 19a, generated by beam pair selector 10a, in response to locating a target in a beam pair, gates on or through a component of target height from each of the component generators, 74, 17a, 80, 83 and 86, to the linear summation circuit. These components of height are pulses of equal widths and occurring essentially simultaneously with the target echo. The pulse width is usually made comparable to target echo widths, approximately six microseconds. The components of target height 13a, 77, 82, 85, and 88, all occurring simultaneously, are summed in linear summation circuit 93 and produced as an output pulse 89 with an amplitude proportional to the true height of the target. This analog height can be viewed directly on a range-height indicator or changed into digital information in an analog-to-digital converter. Pulse 89 is shown with a flat top, while for explanation, pulses 13a, 77, 85 and 88 are shown to have a slope at their peak. As previously stated, any upward or downward pulse tilt is negligible during the small summation interval.

Figure 8:
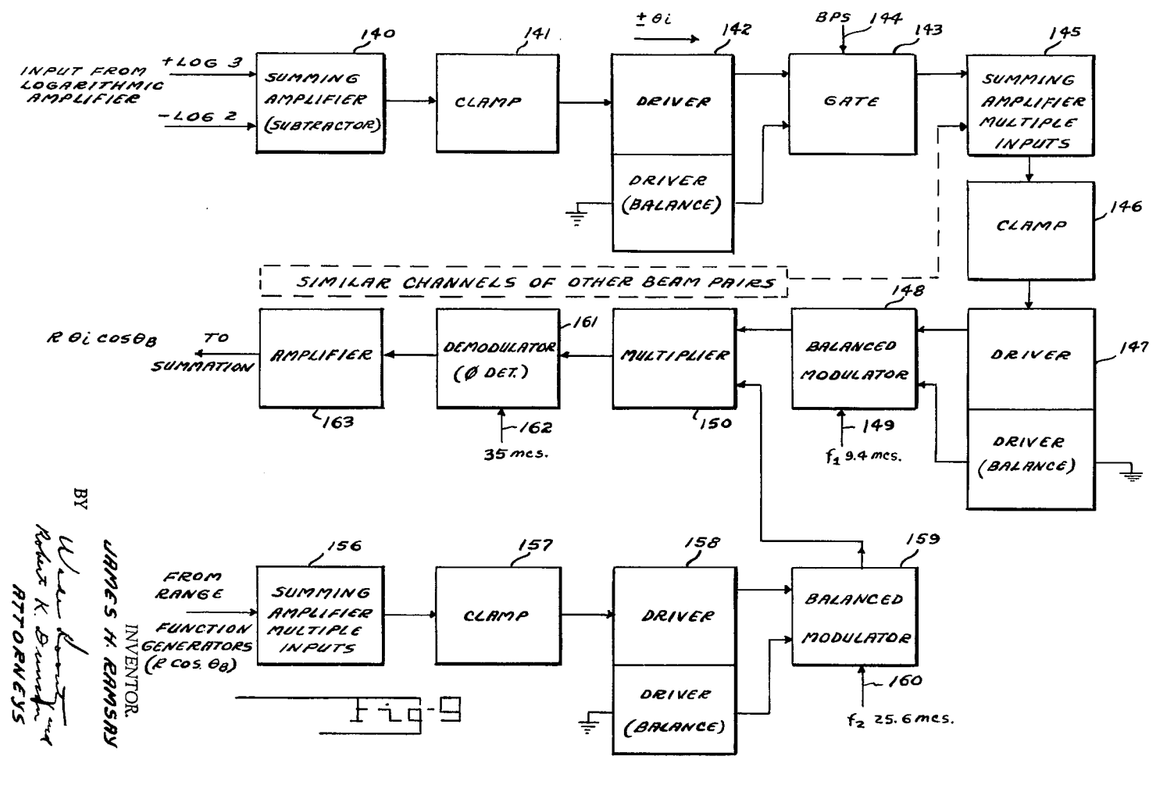
FIG. 8 is a block diagram of the beam pair selector.

FIG. 8 is a block diagram of the beam pair selector. The same polarity video outputs from the log amplifier are summed two at a time in summing amplifiers. The summing amplifiers may be identical, there being one for each beam pair. In a typical embodiment, the summing amplifier 101 may consist of a two-transistor feedback amplifier having unity gain from each input to the output, the outputs from the summing amplifiers then are clamped, 102, and fed into emitter followers, with the emitter followers feeding into peak select circuit 103. The clamping circuit is a "box-carring" circuit; stretching and squaring the input pulse at its maximum level. The peak select circuit 103 may consist of identical transistors, one for each beam pair, all with a common emitter resistor. An output is produced at the collector of the transistor with the most positive base. If two beams have equal signals larger than all others, output will be obtained from both transistors. This condition is obtained when a target is on the axis of a beam. It is also necessary that the input signals exceed a threshold voltage in order to produce an output. Suitable adjustment of the threshold voltage 105 prevents receiver thermal noise from operating the circuit.

The output of peak select circuit 103, is fed into an amplifier and limiter circuit 106 which may be a common emitter transistor amplifier which is biased so that it requires an input signal greater than a definite amount to produce an output. To insure uniformity of operation, the output signals from all these amplifiers are limited to a specific amplitude. The amplifier and limiter 106 drives a pulse generator 107, which produces the beam pair gate pulse. Pulse generator 107 may be a "Schmitt" trigger circuit. Only one pulse generator (107 being the one representing beam pair 8–9) may be allowed to be on at a time. To insure that a second one does not "fire" for the duration of a prior pulse, all other generator circuits are disabled by a signal on the inhibit line 108, generated by summing amplifier 109. The inhibit line signal is a sum of all beam gates and will therefore be in an inhibit condition when any beam gate is on. A de-inhibit line is provided from each pulse generator output to the inhibit input; thus the first generator to fire is prevented from self-inhibiting. All other generators are inhibited, however, by the firing of the first (one to fire) and may not fire until the end of the first input pulse.

Occasionally, at a beam pair cross-over, the peak selector will pick two adjacent beam pairs rather than one because their sums are nearly equal. In such a case, both pulse generators will attempt to fire simultaneously, and both would de-inhibit themselves also, since they fire simultaneously. In this situation, either computation would be acceptable (as previously set forth, see FIG. 6) but to prevent confusion in the circuitry, a preference or precedence control line 111 is added. This gives the pulse generator 107 for beam pair 8–9 precedence over the pulse generator for beam pair 7–8. Likewise, line 112 gives the pulse generator for beam pair 9–10 precedence over pulse generator 8–9. There is no precedence control over the pulse generator for the beam pair having the highest angle of elevation. The logic of the precedence control is that whenever this ambiguous condition occurs, rather than passing two simultaenous beam gates, the one of higher elevation takes control and inhibits the output of the other.

Figure 12:
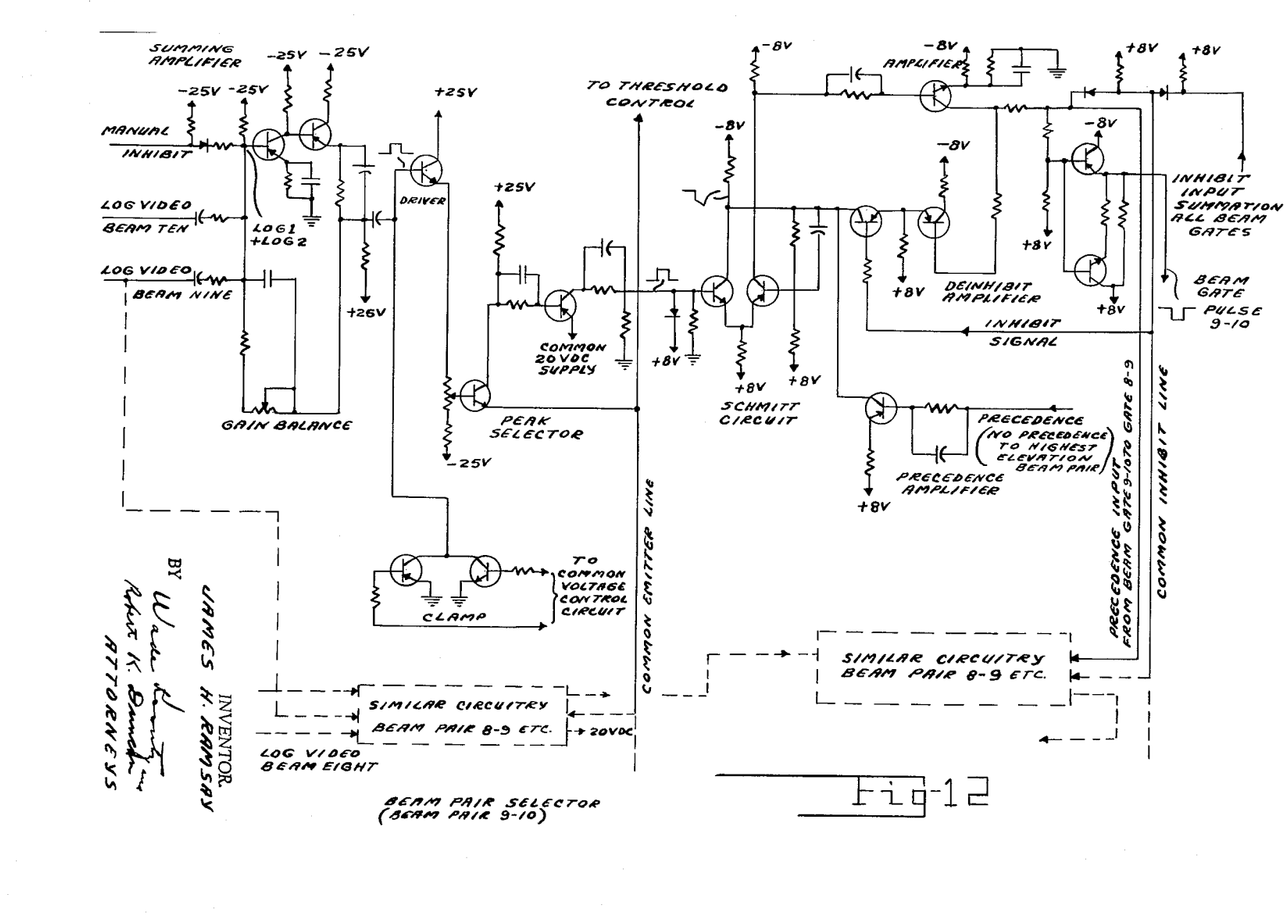
FIG. 12 is a schematic diagram of an embodiment of the beam pair selector.

A schematic diagram of an embodiment of the beam pair selector, which provides the beam gate pulse using Schmitt triggers in the gate generating circuit is shown in FIG. 12.

Figure 11:
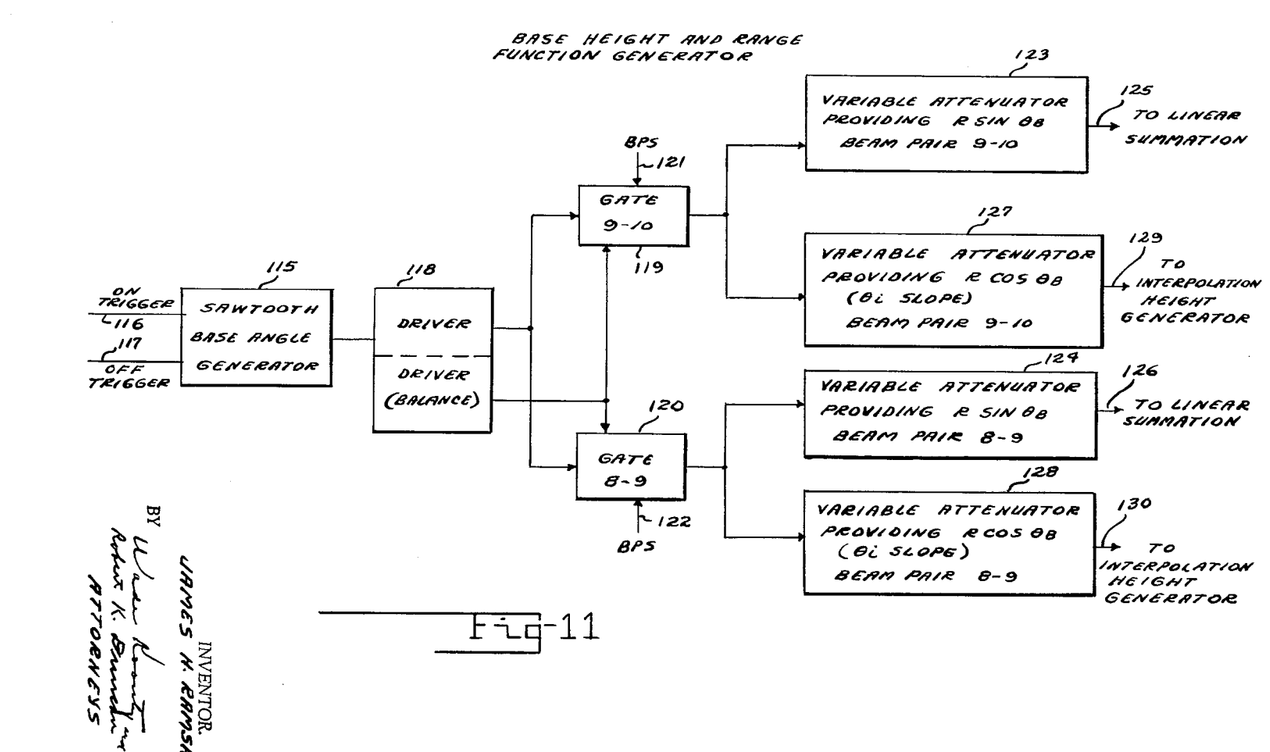
FIG. 11 is a block diagram of the base height and range function generator.

The base height and range function generator 17a of FIG. 7 is shown in block presentation in FIG. 11. To obtain the base height of the target, sawtooth voltages are initiated at zero range, and sampled coincident with the target returns. Since the antenna is composed of a multichannel stacked-beam array, more than one sawtooth voltage is generated. For purpose of illustration, assume the antenna consists of anly one beam pair whose center line is elevated to a base angle $\theta_B$. If generation of a sawtooth waveform is initiated at zero range (from the antenna) and terminated at maximum height-finding range, the slope of this sawtooth will be proportional to the base angle of the antenna beam pair. When the sawtooth waveform is sampled at the time of target return, the amplitude of the waveform obtained will be an indication of the base height of the target, and thus proportional to the slant range times the sine of the base angle.

By attenuating the sawtooth waveform different discrete amounts, this same sawtooth waveform could generate base height information for more than one antenna beam pair. In the partial embodiment of the base height and range function generator shown in FIG. 11, sawtooth base angle generator 115 is shown supplying the sawtooth for beam pairs 8–9 and 9–10. The use of these particular beam pairs in this figure is illustrative only, it being understood that the number of beam pairs accommodated by the height computer is determined by, and is one less than the number of beams in the antenna target at the center of the two only if the height of the two targets places them in the same beam, since the vertical resolution is one beamwidth. This is identical to the case in azimuth, for example, where two targets closer than one beamwidth in azimuth angle would appear as one target. For targets spread more than one beamwidth in elevation angle (but coinciding in range and azimuth), the computer will pick the one with the higher signal strength or, if both have the same amplitude, it will pick the one at the higher elevation angle due to the precedence circuitry in the beam pair selector. Normally, the two targets will not be exactly coincident in range even though their returns overlap; in this case the computer will select the one appearing first in range, first, and will then switch to the second at the end of the first even though the two may be overlapped by one-half pulse width or more.

In this novel height computing system essentially all the computer parameters are independent of each other. This makes possible the independent setting of the circuitry to match the antenna pattern; even if the antenna beamwidths are unequal, or their sensitivities are different, whether these factors occur by design or circumstance. Calibration of the computer after relocation of the antenna site is also readily possible due to the independence of each of the parameters of target height in the disclosed computer.

In this adjacent beam height computer sixty to ninety percent of the output waveform is internally synthesized by pulse circuits. Noise and logarithmic amplifier spikes appear only on the interpolation part of the height signal, which is a relatively small part of the total signal, thus producing a "clean" signal for following associatively connected equipment.

It is to be understood that in the practical use of this invention various test signals, calibrating signals, impedance matching and gain adjusting circuits, blanking or disabling signals, initiating signals, and other similar control signals may be highly desirable. These circuits would be logical and normal in the usage of electronic circuitry of the complexity herein disclosed, but they are not novel and would merely burden the disclosure.

If the stacked beam radar with which this interpolated base height computer is to be used does not have both positive and negative video outputs available for each beam, a conventional inverting amplifier stage to provide a signal of opposite polarity for each beam would be incorporated in the height computer.

The embodiments previously set forth are to be considered as illustrative and not limiting. Persons skilled in the art will make many refinements and modifications to the invention as herein described without departing from the scope of the invention as defined in the appended claims.

What is claimed is:

1. In a stacked beam radar system having an independent logarithmic echo signal output for each of the plurality of stacked beams, apparatus for determining the height of a radar target having a slant range R, said apparatus comprising: beam pair selecting means receiving said logarithmic outputs for selecting the adjacent pair of said beams containing the strongest echo returns from said target, and said beam pair selecting means providing an output indicative of said selected beam pair; subtracting means actuated by said beam pair selecting means receiving said logarithmic outputs for subtracting the echo return signals in said selected pair of adjacent beams to provide an output giving the magnitude and sign of the difference angle, $\theta_i$, between the target elevation and the elevation $\theta_B$ at which said selected beam pair have equal outputs; generating means coupled to said beam pair selecting means and having an output proportional to $R \sin \theta_B$ and an output proportional to $R \cos \theta_B$ for the selected beam pair; multiplying means coupled to said subtracting means and said generating means for providing an output proportional to the product $\theta_i R \cos \theta_B$; and summing means coupled to said generating means and said multiplying means for providing an output proportional to the sum of said $R \sin \theta_B$ and said $\theta_i R \cos \theta_B$.

2. In a stacked beam radar system having an independent logarithmic output of the echo return signal from a target in each of the plurality of stacked beams, the equal response elevation angle for each pair of adjacent beams connoting a base angle, the apparatus for determining the height of a radar target having a determined range, said apparatus comprising: base angle selecting means receiving said logarithmic outputs and selecting the base angle of said pair of adjacent beams containing the strongest said echo return from said target, and said selection means providing an output indicating said selected base angle; subtracting means activated by the output of said base angle selecting means and receiving said logarithmic outputs providing a first value output proportional to the difference in said logarithmic outputs of the echo returns in the beam pair of said selected base angle; generating means coupled to said base angle selecting means and said radar system having a second value output proportional to the sine of said selected base angle times the said range of said target, and a third value output proportional to the cosine of said selected base angle times the said range of said target; multiplying means receiving said output of said subtracting means and said output of said generating means providing a fourth value output proportional to said first value times said third value; and summing means providing an ouput proportional to the summation of said second value and said fourth value.

3. A computing system for determining the height of a radar target in a stacked beam radar system having independent logarithmic outputs of the target echo return signals from each of the plurality of stacked beams, the intersection of the equal response elevation angle of each pair of adjacent beams connoting a base angle, and said radar system having in initiating trigger pulse, the computing system comprising: base angle selecting means receiving said logarithmic outputs and selecting the base angle of said pair of adjacent beams containing the strongest echo return from said target and providing an output pulse substantially coincident with said echo returns indicating said selected base angle; subtracting means actuated by the output pulse of said base angle selecting means and receiving said logarithmic outputs for providing a difference output pulse proportional to the difference in said logarithmic outputs of the echo returns in the beam pair of said selected base angle; generating means receiving the output pulse of said base angle selecting means and said trigger pulse for providing a first output pulse proportional to the sine of the selected base angle and the time interval between said trigger pulse and said output pulse of said base angle selecting means, and providing a second output pulse proportional to the cosine of the selected base angle and the time interval between said trigger pulse and said output pulse of said base angle selecting means; multiplying means multiplying said difference output pulse and said second output pulse providing a product output pulse proportional to their product; and summing means providing an output pulse substantially coincident wtih the target echo return proportional to the sum of said first output pulse and said product output pulse.

4. A computing system for determining the height of a radar target in a stacked beam radar system having independent logarithmic outputs of the echo return signals from said target in each of the plurality of stacked beams, and having the equal response elevation angle of each pair of adjacent beams connoting a separate base angle, and said radar system providing a trigger pulse at the initiation of each pulse of transmitted radiation, the computing system comprising: beam pair selecting means searray of the radar. The sawtooth generator 115 may be a conventional bootstrap sawtooth generator receiving initiating trigger 116 and terminating trigger 117 from the radar. A balanced driver 118 providing opposing inputs to each gate circuit 119 and 120 may be used to reduce errors caused by D.C. drift of the sawtooth in the driver. The input 121 from the beam pair selector for beam pair 9–10 controls gate 119 and the input 122 from the beam pair selector for beam pair 8–9 controls gate 120. Up to this point the same sawtooth represents both beam pairs 9–10 and 8–9. By the use of calibrating variable attenuators 123 and 124 the slope of the sawtooth is adjusted independently providing two sawtooths respectively representing beam pair 9–10 and beam pair 8–9. It may be seen, however, that the complete range of the sawtooth is not presented to the attenuator since the sawtooth has been priorly time-gated by the beam pair selector in the gate circuits 119 and 120. The output 125 of variable attenuator 123 can now be seen to be a pulse proportional to the slant range of a target appearing on beam pair 9–10 times the sine of the angle of elevation of that beam pair. This pulse represents the base height of the target, it occurs essentially simultaneously with the echo of the target, and is ready for summation with the other components of target height. Likewise, output 126 has similar information for beam pair 8–9.

To obtain the interpolation height the function $R \cos \theta_B$ is required. By the proper attenuation of the same sawtooth it may be used to represent either the sine or cosine function. Variable attenuator 127 provides an output 129 representing $R \cos \theta_B$ for beam pair 9–10 and variable attenuator 128 provides an output 130 representing $R \cos \theta_B$ for beam pair 8–9. Obviously, the gated pulses extracted from these sawtooth functions also occur essentially simultaneously with the echo return of the target.

A block diagram of the interpolation height generator is represented in FIG. 9. As previously stated, its purpose is to determine the magnitude and sign of the interpolation angle $\theta_i$ and to perform the multiplication of $\theta_i$ times $R \cos \theta_B$. The multiplication may be done by modulating one R.F. carrier with the function $\theta_i$ and another R.F. carrier with the function $R \cos \theta_B$, then mixing the carriers. The product is then obtained by selecting the output frequency whose amplitude is proportional to the product of the amplitude of the input modulation signal. The modulation product is then detected and amplified. The amount of amplification is set to make the representative voltage value of the interpolation height compatible with the representative values of the other components of target height fed to the linear summation circuit.

Summing amplifier 140, since it receives the logarithm of the signal from beam 3 as a positive value and the logarithm of the signal from beam 2 as a negative value, effectively subtracts beam 2 from beam 3. This difference signal is clamped at its maximum value and stretched by clamp 141 so as to present a stable "boxcar" pulse to driver 142. Driver 142 is preferably of the balanced type to effect a high degree of stability. The output from each driver of the group of drivers (one for each beam pair) is gated through a gate, for each beam pair, that is controlled by the pulse from the beam pair selector. Gate 143 is the gate for beam pair 2–3 and it is controlled by the beam gate pulse 144 representing beam pair 2–3 from the beam pair selector. By this means only the signal in the beam pair in which the target is located is gated through to the summing amplifier 145. Thus, amplifier 145 serves like an OR-gate which accepts the interpolation angle pulses ($\theta_i$), positive or negative, from any beam pair. Its output pulse is squared by clamp 146 and coupled through driver 147 to modulate $f_1$, the carrier 149 fed to balanced modulator 148.

In a specific operating embodiment of this invention, the carrier frequency 149, $f_1$, is generated by a crystal controlled 9.4 mcs. oscillator. Balanced modulator 148 may be a ring type modulator, which in the absence of an interpolation angle pulse ($\theta_i$), the R.F. signal is cancelled and no output is present. With the application of an interpolation angle pulse, the ring modulator is unbalanced, and the R.F. voltage is gated out, with an amplitude equal to the interpolation angle pulse and the carrier phase controlled by the sign of the interpolation angle pulse. The output of modulator 148 containing the sign and magnitude of $\theta_i$ is applied to multiplier 150.

Figure 10:
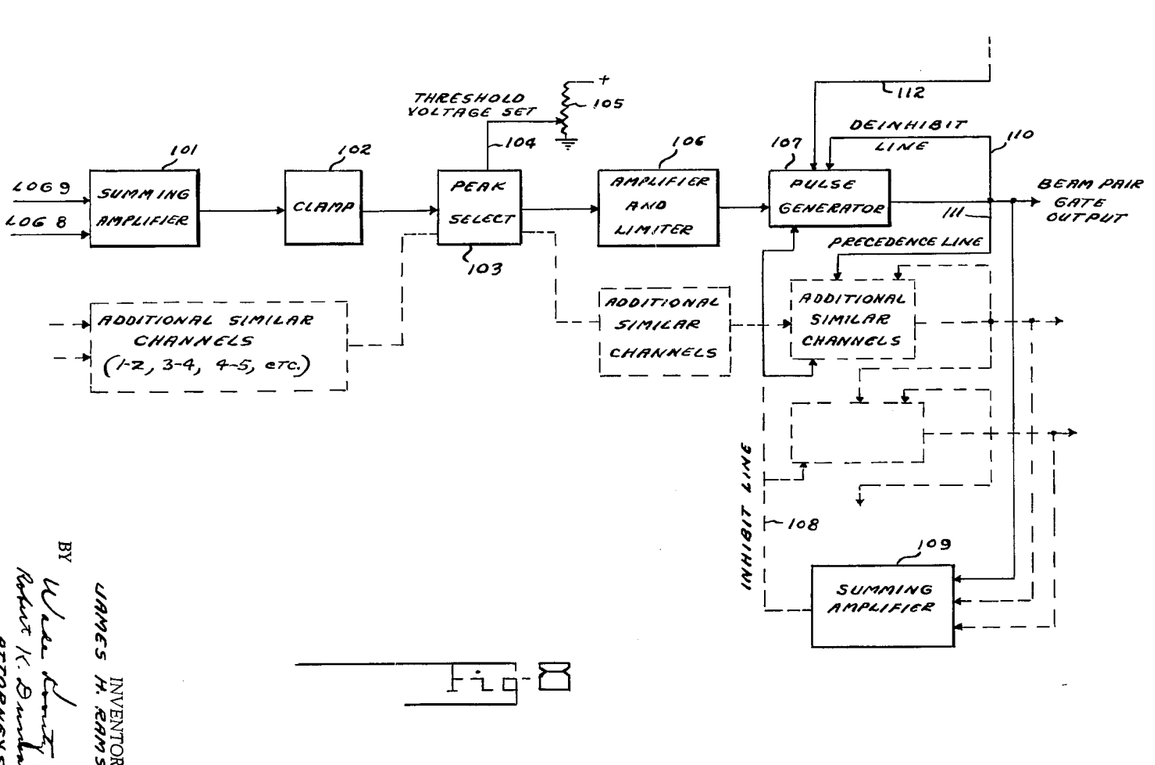
FIG. 10 is a block diagram of the local oscillator section of the multiplier contained in the interpolation height generator.

The local oscillators used in the operation of the enumerated multiplies system of the interpolated height generator are shown in block form in FIG. 10. The 9.4 megacycle crystal controlled oscillator 151 generates the carrier $f_1$, for $\theta_i$, and a 25.6 megacycle crystal controlled oscillator 152 generates the carrier $f_2$ for the function $R \cos \theta_B$. While these particular frequencies have been found to be very satisfactory in the operation of the height computer, it is to be understood that they are not limiting. The frequency used in the demodulator is the sum of the two oscillator frequencies ($f_1+f_2$). In the embodiment shown it is 35 megacycles.

Referring to FIG. 9, the signal lines for each of the separate outputs of $R \cos \theta_B$ from each of the range function generators (one for each beam pair) are summed in summing amplifier 156. Like summing amplifier 145, summing amplifier 156 serves like an OR-gate since the beam pair selector has gated through the pulse of $R \cos \theta_B$ only on the circuit of the beam pair that contains the target. Clamp 157 "boxcars" the pulse $R \cos \theta_B$ and conducts it to driver stage 158 which presents it to balanced modulator 159. The R.F. carrier $f_2$, 160, is modulated by this pulse in the identical manner that $f_1$ was modulated by the $\theta_i$ pulse, except that since range is always positive, the modulating voltage does not change polarity and, therefore, the output frequency shift is zero.

Multiplier 150 may consist of a conventional mixer stage that combines the modulated $f_1$ signal and the modulated $f_2$ signal to produce a composite modulated frequency equal to the sum frequency which is proportional to the product of $\theta_i$ times $R \cos \theta_B$. (It has been found desirable in the enumerated operating embodiment to employ a filter on the 9.4 megacycle input to reject the third harmonic, which is close to the 25.6 megacycle frequency.) The modulated sum frequency is applied to demodulator 161 which may be a ring demodulator phase detector, which also receives the reference signal 162 from the mixer of the combined local oscillators 153 (FIG. 10). The use of the reference input 162 permits amplitude detection of the $R\theta_i \cos \theta_B$ pulse with the polarity of the output dependent on the phase shift of the input. Since the $R \cos \theta_B$ pulse phase shift is constant (zero), and the interpolation angle pulse shift is dependent on the sign of the angle, the significance of the interpolation angle height component is maintained. The $R\theta_i \cos \theta_B$ pulse output from the demodulator 161 is amplified in amplifier 163 to the value required for compatibility with the other components of target height fed to the linear summation circuits.

The linear summation circuit 93 (FIG. 7) accomplishes the final summation of the components of target height. Since the input signals representing the components of target height are sumultaneously presented and scaled to proportional magnitudes, a resistive summing network in the grid circuit of a vacuum amplifier with an overall unit gain may be used. However, any linear summation circuit designed with radar techniques will provide an output pulse 89 proportional to target height.

In order to better understand the functioning of this computer the following statements are to be considered.

In the case of two targets at the same range and azimuth, the output of the computer will appear as a single lecting by peak selection the adjacent beam pair having the largest summation magnitude of echo return at each time of echo return from said target, and providing an output pulse substantially at the time of the echo return indicating the beam pair selected; subtracting means actuated by the output pulse of the beam pair selecting means, subtracting the logarithmic outputs of the echo return signals in the selected beam pair for the duration of the output pulse of the beam pair selecting means, and having a difference output pulse proportional to the difference in the magnitudes of said logarithmic outputs; sawtooth voltage generating means initiated by said trigger pulse and gated by the output pulse of said beam pair selecting means providing a first output pulse with magnitude proportional to the sine of the base angle connoted by said selected beam pair and the time interval between said trigger pulse and said output pulse of beam pair selecting means, and a second output pulse with magnitude proportional to the cosine of the base angle connoted by said selected beam pair and the time interval between said trigger pulse and said output pulse of beam pair selecting means; multiplying means having a product output pulse proportional to the product of said difference output pulse and said second output pulse of said sawtooth voltage generating means; and summation means providing an output pulse, substantially coincident with the target echo return, having a magnitude proportional to the summation of said first output pulse of said sawtooth voltage generating means and said product output pulse.

5. Apparatus for determining the absolute height above sea level of a radar target in a radar system having a tiltable stacked beam antenna array at a site elevation and having an independent logarithmic output of the target echo return signal for each of the plurality of vertically stacked beams, the equal response elevation angle for each pair of adjacent beams being designated the base angle for that pair, and said radar system having a trigger pulse coincident in time with the initiation of the radiated radar pulse, the apparatus comprising: beam pair selecting means selecting the adjacent beam pair having the combined strongest echo output, by the peak selection of the summation of the said logarithmic outputs of adjacent beam pairs, and providing an output pulse substantially coincident with said echo return indicating beam pair selected; a first sawtooth voltage generating means initiated by said trigger pulse and gated by the output pulse of said beam pair selecting means providing a first gated output pulse with a magnitude proportional to the sine of the base angle connoted by said selected beam pair and the time interval between said trigger pulse and said output pulse of the beam pair selecting means, said first gated output pulse being proportional to and representative of the base height of said target, and providing a second gated output pulse with a magnitude proportional to the cosine of the base angle connoted by said selected beam pair and the time interval between said trigger pulse and said output pulse of the beam pair selecting means; subtracting means receiving said logarithmic outputs and said output pulse from the beam pair selecting means subtracting the logarithmic outputs of the echo return signals in the selected beam pair for the duration of the output pulse of the beam pair selecting means and having a difference output pulse proportional to the difference in the magnitudes of said logarithmic outputs, said difference output connoting a value of interpolation angle; multiplying means multiplying said value of interpolation angle and said second gated output pulse of said first sawtooth generating means providing an output pulse proportional to and representative of the interpolation height of said target; voltage generating means gated by said output pulse of beam pair selecting means providing a pulse proportional to and representative of said site elevation of said vertically stacked antenna array; second sawtooth voltage generating means initiated by said trigger pulse and gated by said output pulse of said beam pair selecting means providing an output pulse representative of the tilt of said antenna array, said pulse being proportional to the angle of tilt of said stacked beam antenna array, the time interval between said trigger pulse and said output pulse of said beam pair selecting means, and inversely proportional to the relative elevation of said selected beam pair; parabolic voltage generating means initiated by said trigger pulse and gated by said output pulse of said beam pair selecting means providing a pulse proportional to and representative of the curvature of the earth subtended from said antenna side to said target; and voltage summing means providing an output pulse proportional to the sum of said representative pulses of, said target base height, said target interpolation height, said antenna site elevation, said antenna tilt, and said earth's curvature, said output pulse of said summing means being proportional to said target absolute height, and occurring substantially simultaneously with each said target echo return signal.

6. The apparatus of claim 5 wherein said parabolic voltage generating means is generated by the integration of a sawtooth voltage.

References Cited by the Examiner
UNITED STATES PATENTS

| | | |
|---|---|---|
| 2,444,770 | 7/1948 | Fyler. |
| 2,444,771 | 7/1948 | Fyler. |
| 3,031,657 | 4/1962 | Trunk _______________ 343—5 |
| 3,143,735 | 8/1964 | Martin. |

CHESTER L. JUSTUS, *Primary Examiner.*

E. T. CHUNG, P. M. HINDERSTEIN,
*Assistant Examiners.*